United States Patent
Guarnera et al.

(10) Patent No.: US 8,144,977 B2
(45) Date of Patent: Mar. 27, 2012

(54) METHOD AND RELATIVE DEVICE OF COLOR INTERPOLATION OF AN IMAGE ACQUIRED BY A DIGITAL COLOR SENSOR

(75) Inventors: Mirko Ignazio Guarnera, Gela (IT); Valeria Tomaselli, San Pietro Clarenza (IT); Giuseppe Messina, Giardini Naxos (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 937 days.

(21) Appl. No.: 12/217,309

(22) Filed: Jul. 2, 2008

(65) Prior Publication Data

US 2009/0010539 A1    Jan. 8, 2009

(30) Foreign Application Priority Data

Jul. 3, 2007 (IT) .................................. VA07A0059

(51) Int. Cl.
*G06K 9/00* (2006.01)
(52) U.S. Cl. ....................................................... 382/162
(58) Field of Classification Search .................. 345/606; 348/538, 539; 358/525; 382/162, 167, 261, 382/264, 300
See application file for complete search history.

(56) References Cited

U.S. PATENT DOCUMENTS

| | | |
|---|---|---|
| 3,971,065 A | 7/1976 | Bayer |
| 6,842,191 B1 | 1/2005 | Smith |
| 2006/0072814 A1 | 4/2006 | Messina et al. |

OTHER PUBLICATIONS

Gupta, M., et al., "Vector Color Filter Array Demosaicing," SPIE Electronic Imagine, pp. 9, 2001.*
Kakarala, R., et al., "Adaptive Demosaicing with the Principal Vector Method," IEEE Transactions on Consumer Electronics, vol. 48, No. 4, pp. 932-937, Nov. 2002.*
Chang, E., et al., "Color Filter Array Recovery Using a Threshold-based Variable Number of Gradients," Proc. SPIE, vol. 3650, pp. 36-43, 1999.*
Chang, L., et al., "Effective use of Spatial and Spectral Correlations for Color Filter Array Demosaicking," IEEE Transactions on Consumer Electronics, vol. 50, No. 1, pp. 355-365, Feb. 2004.
Gunturk, B., et al., "Color Plane Interpolation Using Alternating Projections," IEEE Transactions on Image Processing, vol. 11, No. 9, pp. 997-1013, Sep. 2002.
Kimmel, R., "Demosaicing: Image Reconstruction from Color CCD Samples," Computer Scient Department, Technion, Haifa 32000, Israel, 16 pages, Oct. 5, 1999.
Ramanath, R., et al., "Demosaicking Methods for Bayer Color Arrays," Journal of Electronic Imaging, vol. 11, No. 3, pp. 306-315, Jul. 2002.

* cited by examiner

Primary Examiner — Gregory F Cunningham
(74) Attorney, Agent, or Firm — Seed IP Law Group PLLC

(57) ABSTRACT

A method calculates statistical parameters in function of stochastic momentums of the pixel intensities of a same primary color or complementary hue of a first working window $(2k+1) \times (2k+1)$, and of at least a second working window of smaller size, both centered on the pixel to be filtered and in choosing, as a function of the values of these statistical parameters, for each pixel of the color image to be filtered, the most appropriate filtering algorithm for enhancing as much as possible the contour sharpness and reducing noise and artifacts.

28 Claims, 13 Drawing Sheets

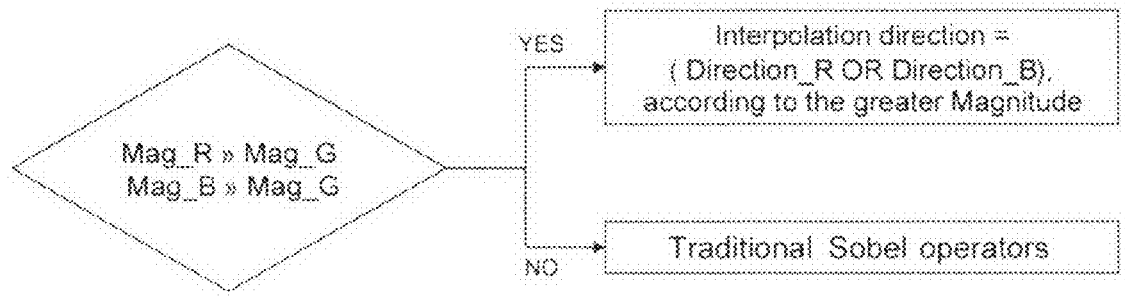
FIG. 11
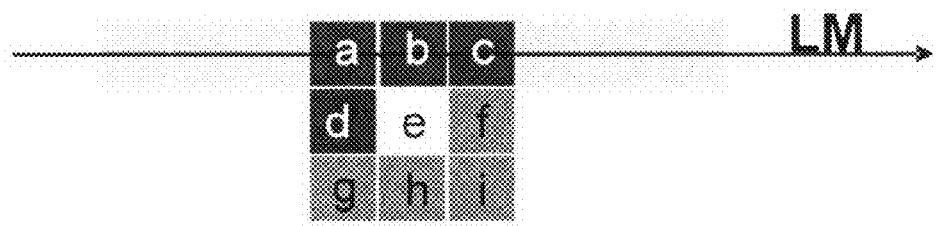
FIG. 12
FIG. 13A
FIG. 13B

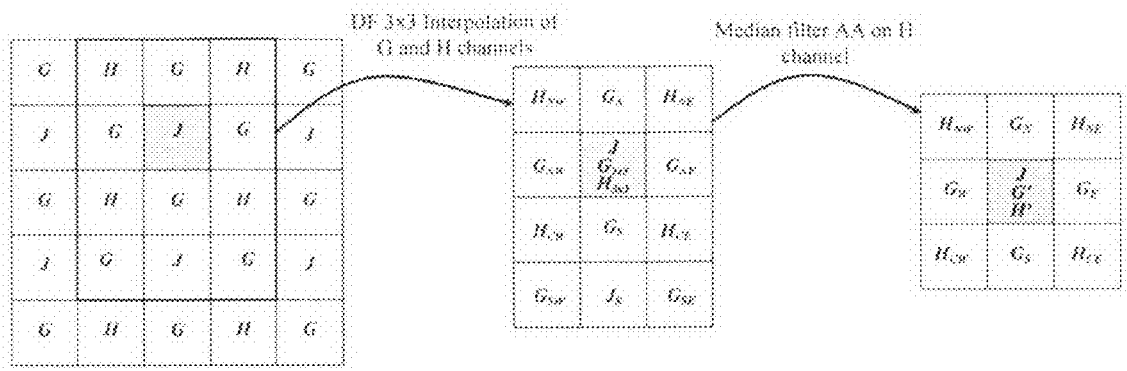
FIG. 21
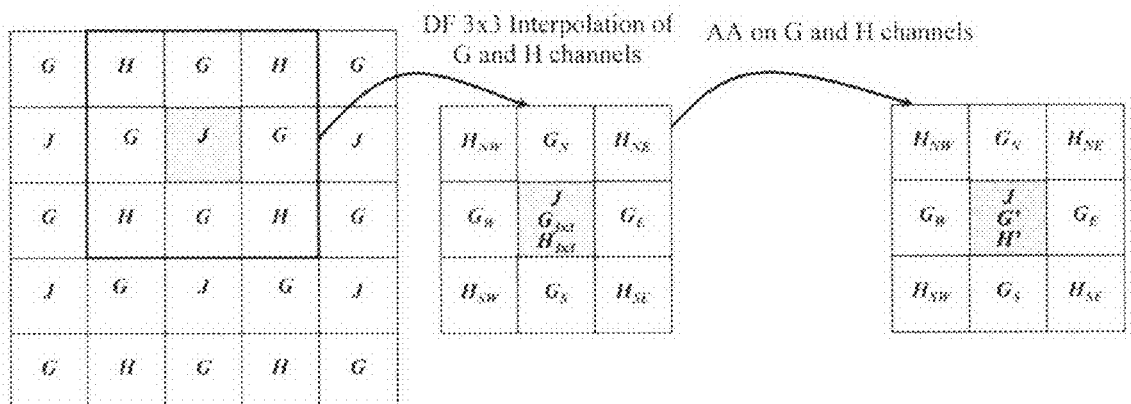
FIG. 22
FIG. 23A    FIG. 23B

METHOD AND RELATIVE DEVICE OF COLOR INTERPOLATION OF AN IMAGE ACQUIRED BY A DIGITAL COLOR SENSOR

TECHNICAL FIELD

This disclosure relates in general to techniques for processing images acquired through a color digital sensor, and more particularly but not exclusively to a method of color interpolation of each pixel of the image acquired from intensity values generated by single photosensitive elements of the sensor, depending on the filter applied according to a certain spatial pattern (for instance according the so-called Bayer Pattern) such to make each single element sensitive to one of the primary colors or base hue.

BACKGROUND INFORMATION

In order to reconstruct a color image it is necessary to carry out an operation known as color interpolation (or demosaicing) such to generate triplets of base color values (RGB) or more values, one for each base hue, through appropriate interpolation algorithms for generating values of missing colors for each image pixel.

Numerous techniques for processing data provided by a digital color sensor have been proposed. It is worth mentioning the following documents:

[1] M. R. Gupta, T. Chen, "Vector Color Filter Array Demosaicing" SPIE Electronic Imaging 2001;
[2] R. Ramanath, W. E. Snyder, G. L. Bilbro, W. A. Sander, "Demosaicing Methods for Bayer Color Arrays", Journal of Electronic Imaging, vol. 11, n. 3, pages 306-315, July 2002;
[3] R. Kimmel, "Demosaicing: Image Reconstruction from Color CCD Samples";
[4] R. Kakarala, Z. Baharav, "Adaptive Demosaicing with The Principal Vector Method", IEEE Transactions on Consumer Electronics, vol. 48, n. 4, pages 932-937, November 2002;
[5] B. E. Bayer, "Color Imaging Array", U.S. Pat. No. 3,971,065, July 1976;
[6] B. K. Gunturk, Y. Altunbasak, R, Mersereau, "Color Plane Interpolation Using Alternating Projections", IEEE Transactions on Image Processing, vol. 11, no. 9, pages 997-1013, September 2002;
[7] Lanlan Chang and Yap-Peng Tan, "Effective use of Spatial and Spectral Correlations for Color Filter Array Demosaicking", IEEE Transactions on Consumer Electronics, Vol. 50, No. 1, pages 355-365, February 2004.
[8] Ed Chang, Shiufun Cheung and Davis Pan, "Color Filter Array Recovery Using a Threshold-based Variable Number of Gradients", Proc. SPIE, vol. 3650, pp. 36-43, 1999.
[9] G. Messina, M. Guarnera, V. Tomaselli, A. Bruna, G. Spampinato, A. Castorina, "Color interpolation method of an image acquired by a digital sensor by directional filtering", U.S. Patent Application Publication No. 2006072814, April 2006.
[10] S. Smith, "Color image restoration with anti-alias", U.S. Pat. No. 6,842,191.

Many known techniques preliminarily subdivide the image data stream generated by the digital color sensor in two or more channels, in three channels for the case of a filtering based upon the RGB triplet of primary colors (red, green, blue), as shown in FIG. 1. When the red component of a pixel is to be estimated, but only its green level has been acquired, it is necessary to estimate the red pixels adjacent to the considered pixel, and so on, when the value of another missing color is to be estimated.

The color interpolation step drastically influences the quality of the whole image generation pipeline and it may produce artifacts.

Clearly, subdividing in different channels grey level data generated by the digital color sensor and the successive merging operation of the values calculated for primary colors or base hues with the known value of the primary color of base hue for the considered pixel implies an evident computational burden or, in case of hardware implementation, an increased circuit complexity.

A wide variety of papers and patents has been produced about color interpolation techniques. Among them, there are non adaptive (linear, cubic, etc.) and adaptive (edge sensing) solutions. Adaptive methods usually outperform non adaptive ones, producing more visually pleasant results, less affected by false colors and zipper effect.

The demand of new consumer applications of digital photo-cameras and similar devices, for instance in cellular phones, in laptop (notebook) or hand-held computers and other devices for mobile communications, forces to devise even more effective and at the same time low cost techniques for processing images acquired by a digital color sensor. A particular important requisite is the low cost, because these techniques must be used in devices economically accessible to single consumers.

BRIEF SUMMARY

It has now been found one or more embodiments of a method of color interpolation and a relative device for implementing it that ensures an enhanced definition of the filtered image in respect to known interpolation methods.

Studies carried out by the applicant showed that performances of the known interpolation methods for filtering a selected pixel depend strongly on the local characteristics of each image, that is on the intensity values of the pixels surrounding the pixel to be filtered. It may happen that a certain interpolation algorithm enhances in certain points the definition of a picture, but in other points make it more blurred.

A feature of one embodiment comprises calculating statistical parameters in function of stochastic momentums of the pixel intensities of a same primary color or complementary hue of a first working window $(2k+1)\times(2k+1)$, for example 5×5, and of at least a second working window of smaller size, for example a working window 3×3, both centered on the pixel to be filtered and in choosing, in function of the values of these statistical parameters, for each pixel of the color image to be filtered, the most appropriate filtering algorithm for enhancing as much as possible the contour sharpness and reducing noise and artifacts.

In an embodiment, the statistical parameters are compared with thresholds and the filtering algorithm is chosen upon the result of these comparisons.

The method of one embodiment may be implemented through a software code executed by a computer or by a microprocessor.

BRIEF DESCRIPTION OF THE SEVERAL VIEWS OF THE DRAWINGS

One or more embodiments is described referring to the attached drawings, wherein:

FIG. 11 illustrates how the gradient is estimated according to an embodiment of the method;

FIG. 12 illustrates schematically how to calculate directional variations for the central pixel of the 3×3 working window using corresponding values calculated for other pixels of the working window, according to one embodiment;

FIGS. 13a and 13b depict two example 5×5 Bayer pattern windows;

FIG. 21 basically shows how to calculate the values G and H of a central pixel of a 3×3 working window for a vertical interpolation direction, according to one embodiment;

FIG. 22 basically illustrates how to calculate the values G and H of a central pixel of a 3×3 working window without an interpolation direction, according to one embodiment;

FIGS. 23a and 23b depict example 5×5 working windows of a Bayer pattern wherein the central pixel of the working window is green and red or blue, respectively;

FIGS. 27a to 29b compare Bayer images interpolated using an adaptive directional filtering with the same Bayer images interpolated according to one embodiment of the method.

DETAILED DESCRIPTION

In the following description, numerous specific details are given to provide a thorough understanding of embodiments. The embodiments can be practiced without one or more of the specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

Figures 1, 2:
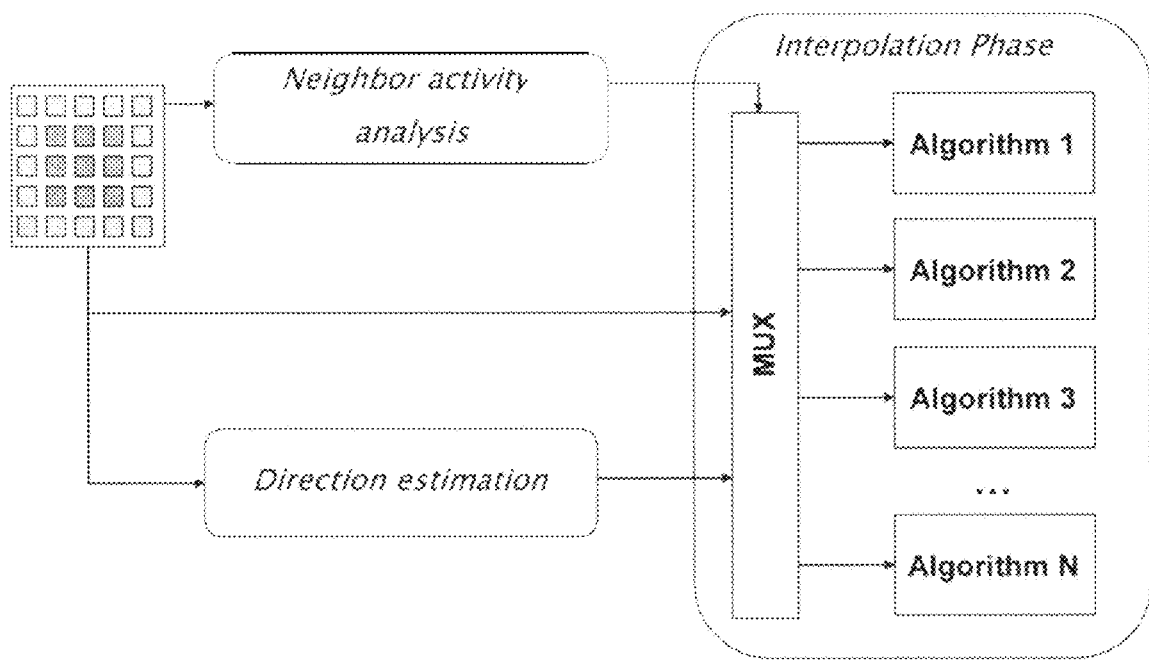
FIG. 1 shows an example Bayer pattern.
FIG. 2 depicts a basic block diagram of a device that implements the method of one embodiment.

In FIG. 2 a block scheme of an embodiment of a device adapted to implement the method described herein is shown. The method substantially comprises three steps:
1) neighbor activity analysis;
2) direction estimation; and
3) interpolation.

The neighbor activity analysis block selects which interpolation algorithm shall be performed, according to the surrounding features (border, texture, flat area, etc.); the direction estimation block computes the direction to be used in the interpolation step, if needed; the interpolation block carries out one of the available demosaicing algorithms, depending on the choice performed by the neighbor activity analysis block. Demosaicing algorithms could use the direction information provided by the direction estimation block for choosing the suitable filter to be applied. Moreover, the available demosaicing algorithms could have different kernel sizes.

Figure 3:
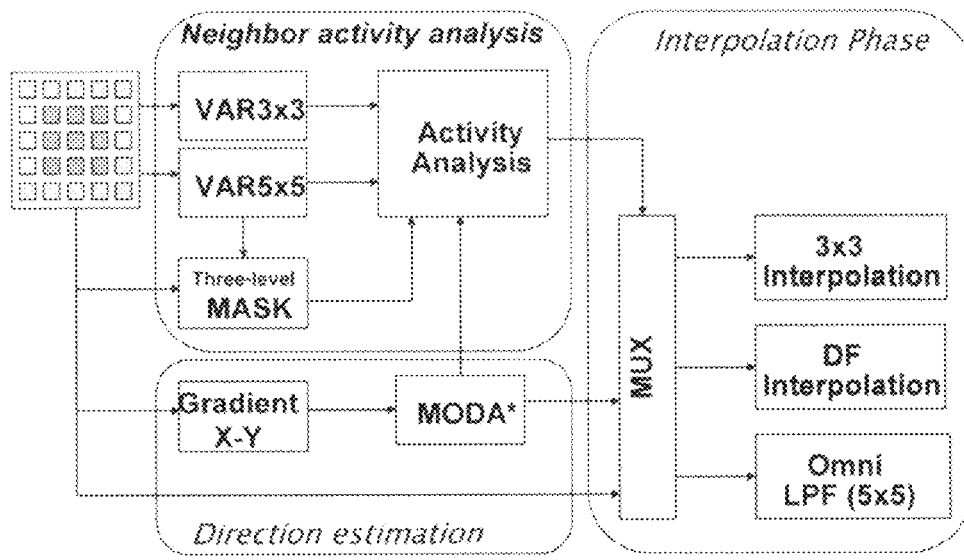
FIG. 3 depicts the main blocks of the device of FIG. 2 according to one embodiment.
Figure 4:
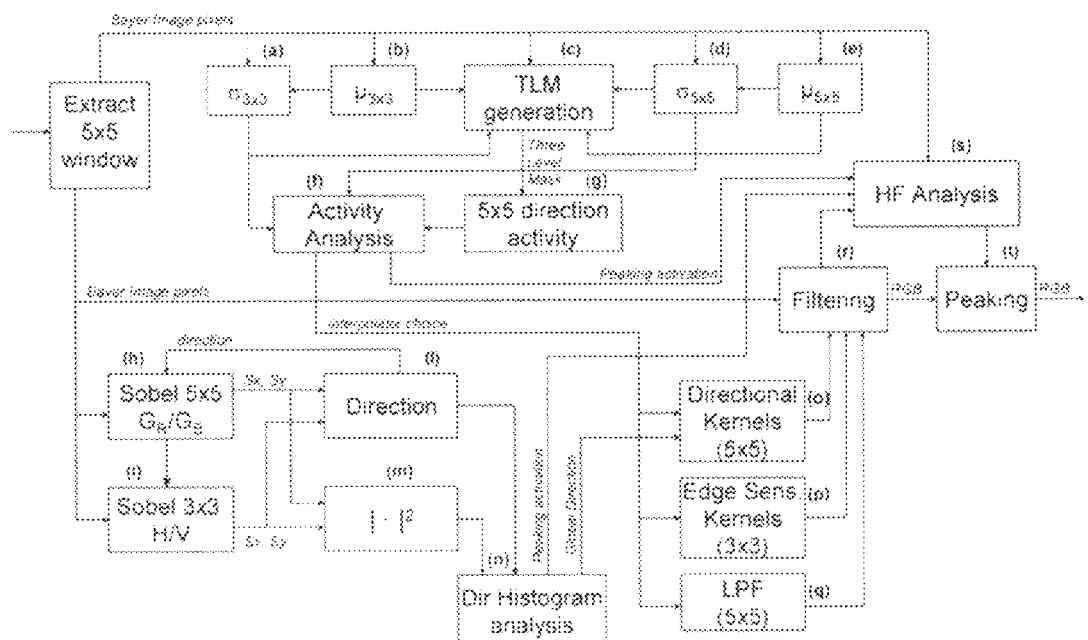
FIG. 4 is a detailed view of the device of FIG. 2 according to an embodiment.

The block scheme of one embodiment is illustrated in FIG. 3, whereas the detailed block diagram is shown in FIG. 4.

Neighbor Activity Analysis

The block Neighbor activity analysis examines different working windows of size (2k+1)×(2k+1), being k pre-established positive integer, centered on a pixel to be interpolated. In function of stochastic parameters calculated using pixels of color planes (or of base hue) comprised in these working windows, a threshold selection criterion is chosen among N possible interpolation algorithms. The interpolation algorithm could be a homogeneous low-pass interpolation carried out on pixels of the working window (2k+1)×(2k+1), an interpolation carried out on pixels of a working window of smaller size than (2k+1)×(2k+1), a directional filtering interpolation carried out on pixels of the working window smaller than (2k+1)×(2k+1), and so on.

A simple criterion for choosing the interpolation to be carried out comprises comparing the variances (that are second order statistical parameters) with a threshold and establishing the type and intensity of the low-pass or high-pass filtering to be carried out in function of this comparison.

A more complex decision criterion comprises the step of estimating a filtering direction on the working window (2k+1)×(2k+1) and using this information for choosing the type and intensity of the interpolation to be carried out.

Hereinafter, reference will be made only to the case of a 5×5 working window, but the same observations could be easily adapted, mutatis mutandis, for even larger working windows.

Figure 5:
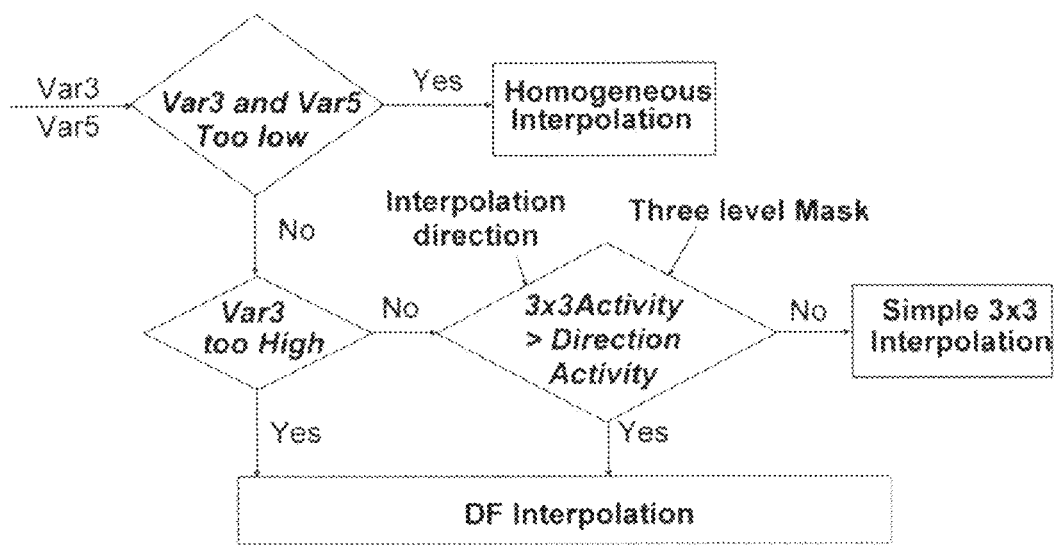
FIG. 5 illustrates the method steps carried out by the block NEIGHBOR ANALYSIS of FIG. 3 according to one embodiment.

In case k=2, that is the size of the working windows is at most 5×5, the neighbor activity analysis block, whose detailed functional scheme is shown in FIG. 5, chooses the best interpolation to be performed for each pixel. To make this choice, it analyzes a neighborhood of the central pixel. More specifically, the variance is computed within a 3×3 and a 5×5 mask. Two thresholds are set for discriminating among different conditions.

Figure 6:
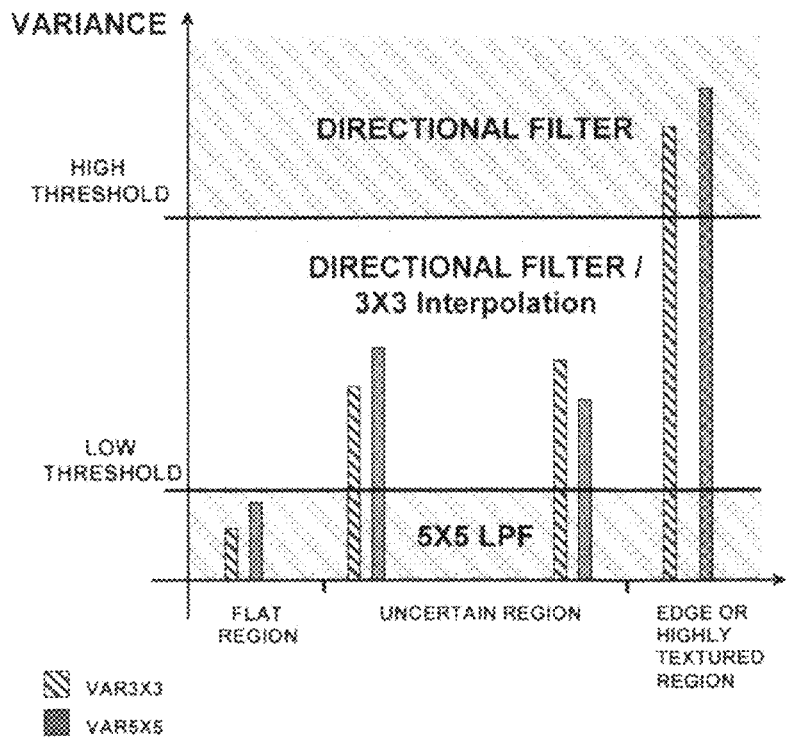
FIG. 6 illustrates the criterion of decision to carry out a low-pass filtering or a directional filtering according to one embodiment of the method.

Referring to FIG. 5 and FIG. 6, if both the variance values are under the low threshold, the region is considered flat and a simple low pass filter interpolation is made in order to remove residual noise.

If the 3×3 variance (FIG. 4.a) value is greater than the high threshold, the region is deemed to contain a border or highly textured and a directional interpolation is made in order to exploit spatial correlation.

All other cases are considered undetermined and an extended investigation called three level analysis is carried out. After this eventual additional step, the central pixel will be interpolated by either a simple 3×3 interpolation or a 5×5 directional interpolation (FIG. 5).

Figure 7:
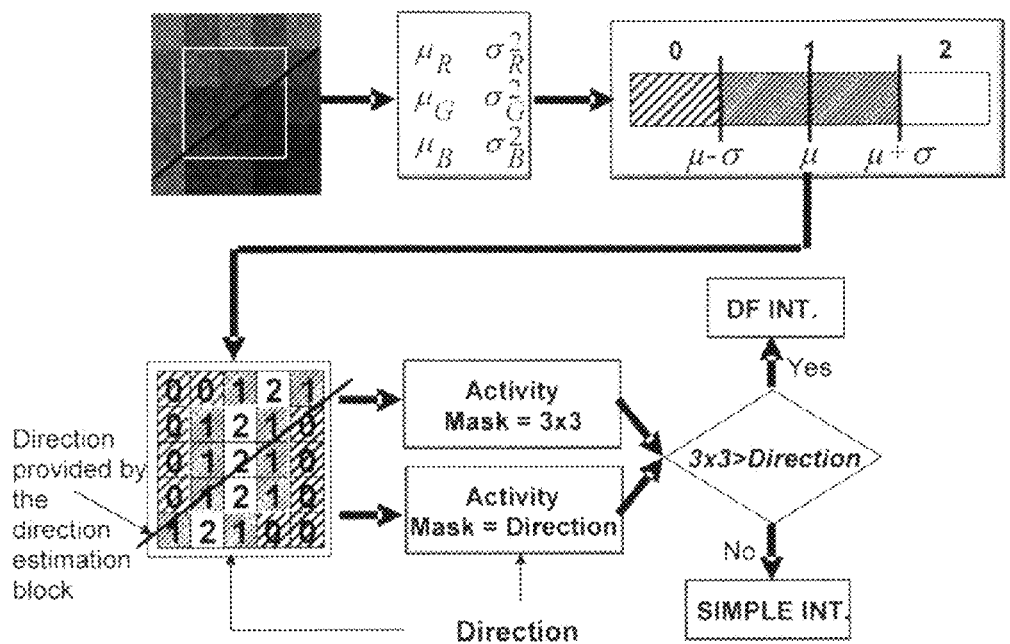
FIG. 7 illustrates in detail the operations carried out by the block TLM GENERATION of FIG. 4 according to one embodiment.

FIG. 7 shows the functional scheme of the three level analysis. The 5×5 variance (FIG. 4.d) information is used to build a Three Level Mask (TLM in FIG. 4.c): each value within the current window is replaced by one of three possible levels: Low (0), Medium (1) or High (2), according to its value with respect to the mean value and standard deviation of a color channel.

Let $\mu$ and $\sigma$ be the mean value and the standard deviation, respectively, of a color channel. If the pixel color level is smaller than $(\mu-\sigma)$, it is replaced by 0; if the pixel color level is comprised between $(\mu-\sigma)$ and $(\mu+\sigma)$, it is replaced by 1; otherwise it is replaced by 2.

Let us define "Activity" the sum of absolute differences of contiguous elements of the TLM within a certain working mask (FIG. 4.g).

$$\text{Activity} = \sum_{i}^{WorkingMask} \left( \sum_{j}^{1D\ surrounding} |p_i - p_j| \right) \quad (1)$$

After the TLM has been generated, two working masks are taken into account and hence two activity values are calculated accordingly. The first working mask is the same for each pixel: it is a square 3×3 mask centered in the pixel under consideration. The choice of the second working mask depends on the direction provided by the direction estimation block (FIG. 4.l) for the current pixel: it includes the pixels along the chosen direction.

The underlying assumption is that the greater the activity within a certain working mask, the lower the uniformity of the image. For a better understanding of this concept, an example is shown in FIG. 8.

Figures 8, 10:
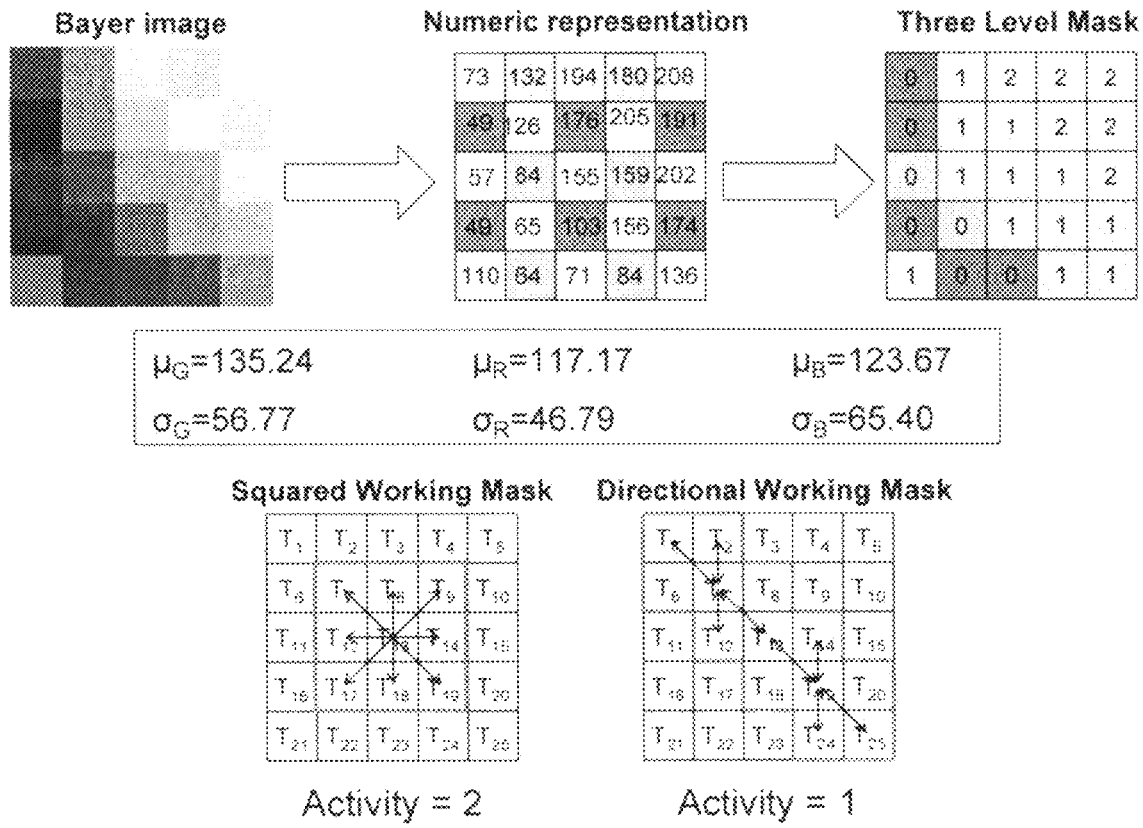
FIG. 8 illustrates the functioning the block TLM GENERATION of FIG. 4 in a sample case according to one embodiment.
FIG. 10 depicts an example 5×5 Bayer pattern window.

In the top left part of FIG. 8, a 5×5 Bayer image is illustrated, then its numeric representation is shown, and finally the eventually generated three level mask image is depicted. For generating the TLM, the mean value and the standard deviation of each color channel are computed. Considering the Red channel, whose mean value and standard deviation are $\mu_R$ and $\sigma_R$, respectively, each original red color value is compared with 70.38 (that is $\mu_R-\sigma_R$) and 163.96 (that is $\mu_R+\sigma_R$): values lower than 70.38 are replaced by 0 (64, in the example); values greater than 163.96 are replaced by 2 (180, in the example); all other values are replaced by 1 (132 and 84, in the example). Of course, the same method is used also for the other two color channels.

In the lower part of FIG. 8, an example of activity computation is shown, where $T_i$ represents the generic element of the TLM. In this example, the border direction is estimated to be 135°, and the correspondent directional working mask is highlighted in the bottom right part of the figure. The activities within the 3×3 square mask and within the 5×5 directional mask are calculated through the (2).

$$3\times3\ \text{Activity} = |T_7 - T_{13}| + |T_8 - T_{13}| + |T_9 - T_{13}| + |T_{14} - T_{13}| + \quad (2)$$
$$|T_{19} - T_{13}| + |T_{18} - T_{13}| + |T_{17} - T_{13}| + |T_{12} - T_{13}|$$
$$5\times5\ \text{Activity} = |T_1 - T_7| + |T_2 - T_7| + |T_7 - T_{12}| + |T_7 - T_{13}| +$$
$$|T_{13} - T_{19}| + |T_{14} - T_{19}| + |T_{19} - T_{24}| + |T_{19} - T_{25}|$$

It is straightforward that the 5×5 directional working mask and its related activity computation formula depend from the border direction, which is provided by the direction estimation block.

Through these two activity values, it is possible to estimate whether or not the activity within the 3×3 square mask is less than the activity along the direction provided by the direction estimation block for the current pixel (FIG. 4.f). If this is the case, a simple 3×3 interpolation is used. This control allows to avoid using the directional 5×5 interpolation in case a wrong direction is estimated, or when the region being processed is close to a border, preventing production of unpleasant artifacts.

If simple interpolation is chosen, the system disables the peaking operation (FIG. 4.s), that consists substantially in introducing in the filtered image high frequency components that were lost during filtering, in order to avoid enhancement of eventually remaining artifacts, as shown in FIG. 4. In the example of FIG. 8, a directional interpolation is chosen for the central pixel, because the 3×3 square mask activity (2) is greater than the activity of the 5×5 mask (1).

Direction Estimation Block

The direction estimation block may be that described in prior patent application [9] above, wherein the derivatives along both horizontal and vertical directions are computed through classical 3×3 $\text{Sobel}_x$ and $\text{Sobel}_y$ filters (FIG. 4.i):

$$\text{Sobel}_x = \begin{bmatrix} -1 & 0 & 1 \\ -2 & 0 & 2 \\ -1 & 0 & 1 \end{bmatrix}; \text{Sobel}_y = \begin{bmatrix} 1 & 2 & 1 \\ 0 & 0 & 0 \\ -1 & -2 & -1 \end{bmatrix} \quad (3)$$

After the $\text{Sobel}_x$ and $\text{Sobel}_y$ values have been computed, the gradient direction and magnitude are calculated by equations (4) and (5), respectively (FIGS. 4.l and 4.m).

$$\text{direction}(\nabla) = \begin{cases} arctg\left(\dfrac{\text{Sobel}_y}{\text{Sobel}_x}\right) & \text{if } \text{Sobel}_x > 0 \\ \dfrac{\pi}{2} & \text{otherwise} \end{cases} \quad (4)$$

$$\text{magnitude}(\nabla) = \sqrt{\text{Sobel}_x^2 + \text{Sobel}_y^2} \quad (5)$$

It has been observed that Sobel filters may identify a wrong gradient direction in correspondence of red-blue transitions. This behavior is apparent from FIG. 9. Because of this weakness of Sobel operators on Bayer images, according to another innovative aspect of an embodiment, the gradient estimation is made as follows.

Figure 9:
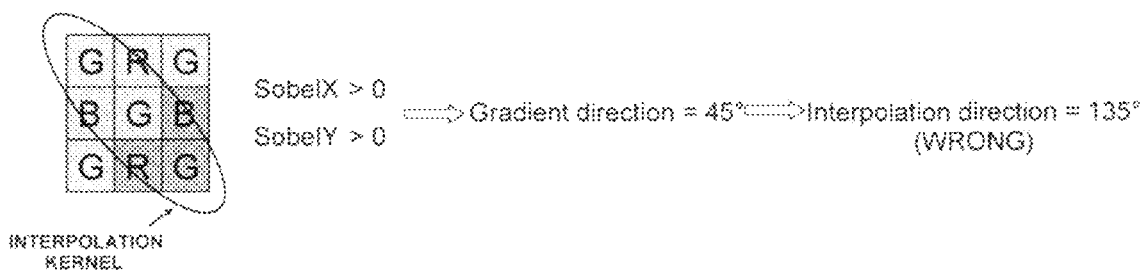
FIG. 9 shows an example critical case in which the use of the Sobel's filters for estimating the direction of interpolation of a 3×3 window leads to an error.

When the central pixel is green, and the green channel is almost constant in a neighborhood, $\text{Sobel}_x$ and $\text{Sobel}_y$ have gradient information about different channels. Referring to FIG. 9, Sobel$_x$ has information about the blue channel, whereas Sobel$_y$ has information about the red channel. This leads to errors in the gradient estimation if the red and blue channels have opposite trends.

In particular, from FIG. 9 it is possible to notice that both Sobel$_x$ and Sobel$_y$ are greater than zero. This implies that the gradient is estimated to be equal to 45°. As a consequence, the interpolation direction, that is chosen orthogonal to the gradient direction, is 135°.

This error in the gradient estimation heavily influences the final quality of the image, because interpolation is performed across borders and not along them.

In order to overcome this pitfall, when the central pixel is green, three different gradient directions and magnitudes (one for each color channel) are evaluated in a 5×5 window.

Let us consider the 5×5 window, shown in FIG. 10.

The three gradients are computed with the following equations:

$$\nabla H = \left[\frac{\partial H}{\partial x}, \frac{\partial H}{\partial y}\right] \nabla J = \left[\frac{\partial J}{\partial x}, \frac{\partial J}{\partial y}\right] \nabla G = \left[\frac{\partial G}{\partial x}, \frac{\partial G}{\partial y}\right] \quad (6)$$

$$\frac{\partial H}{\partial x} = [(H_{10} + H_{20}) - (H_6 + H_{16})]/2$$

$$\frac{\partial H}{\partial y} = [(H_6 + 2H_8 + H_{10}) - (H_{16} + 2H_{18} + H_{20})]/4$$

$$\frac{\partial J}{\partial x} = [(J_4 + 2J_{14} + J_{24}) - (J_2 + 2J_{12} + J_{22})]/4$$

$$\frac{\partial J}{\partial y} = [(J_2 + J_4) - (J_{22} + J_{24})]/2$$

$$\frac{\partial G}{\partial x} = [(G_9 + G_{19}) - (G_7 + G_{17})]/2$$

$$\frac{\partial G}{\partial y} = [(G_7 + G_9) - (G_{17} + G_{19})]/2$$

wherein H indicates the red/blue channel and J indicates the blue/red channel, respectively.

The direction "or" and amplitude "mag" of each gradient is computed through the following equations (block h in FIG. 4):

$$or(x, y) = \begin{cases} \tan^{-1}\left(\frac{\frac{\partial Z}{\partial y}}{\frac{\partial Z}{\partial x}}\right) & \text{if } \frac{\partial Z}{\partial x} \neq 0 \quad Z = H, J, G \\ \frac{\pi}{2} & \text{otherwise} \end{cases}$$

$$mag(x, y) = \left(\frac{\partial Z}{\partial x}\right)^2 + \left(\frac{\partial Z}{\partial y}\right)^2$$

With reference to FIG. 11, if both the red (M$_{AG}$_R) and blue (M$_{AG}$_B) amplitudes are greater than the green (M$_{AG}$_G) amplitude, for example if Mag_R>4·Mag_G and Mag_B>4·Mag_G the gradient direction is set equal to the direction provided by the red or blue channel, depending on which one of these two channels has the largest magnitude. In all other cases, the classical 3×3 Sobel filters are applied for determining the gradient direction.

The gradient direction for the current pixel is quantized into K predefined orientations, where K is usually set to 8, and the direction is determined using an operator (block n in FIG. 4) that works on intensities histograms.

According to one embodiment, a "weighted-moda" (WM) operator is used for estimating the prominent magnitude direction in a 3×3 surround as in [9] above, but there are some minor differences. The magnitudes of the gradients in the 3×3 neighborhood of the central pixel are accumulated according to the directions. Then the direction having the maximum total magnitude is chosen as the gradient orientation for the central pixel.

This operation prevents noise from affecting the gradient estimation.

In order to improve the results, the directions that have been already filtered by the weighted-moda operator may be used for calculating the gradient direction for the central pixel. This may be done by introducing a line memory in a hardware system for storing the magnitude and direction of the corresponding pixels of the previous row of the image, as shown in FIG. 12, wherein the direction associated to the pixel (e) is calculated using the already computed directions (a) . . . (d) and the estimated directions (f) . . . (i) as previously explained.

In practice, instead of estimating directions for all the pixels that surround the pixel (e), the previously determined directions for the pixels (a) . . . (d) are used and only the missing directions for pixels (f) . . . (i) are estimated. An advantage of doing so is the fact that directions associated to pixels (a) . . . (d) are determined by determining a moda that is surely more robust and reliable than calculating a gradient.

Sometimes the direction provided by the weighted-moda operator may not coincide with the most recurrent direction within the neighborhood. In these cases, the consequent choice of direction could be wrong and interpolation with a simple 3×3 algorithm, disregarding the directional information, would lead to a better result. Therefore, when the above condition is deleted the peaking phase (FIG. 4.s) is automatically disabled by a dedicated control signal.

Finally, after the gradient orientation has been computed, the border direction is the orthogonal direction to the gradient direction and the computed border direction is provided to the neighbor analysis block for the three-level analysis and to the interpolation block if the directional color interpolation has been selected.

Interpolation Block

The interpolation block may implement one of N different interpolation techniques for each pixel. In one embodiment, this block contains three distinct interpolation methods:
1. 5×5 directional filter (FIG. 4.o);
2. 3×3 simple interpolation (FIG. 4.p);
3. 5×5 omnidirectional low pass filter (FIG. 4.q).

The neighbor analysis block chooses the best algorithm to be performed on each pixel. In the following paragraphs each of these algorithms will be described.

Directional Filtering Color Interpolation

This interpolation algorithm, disclosed in [9] above, exploits the spatial correlation by means of elliptical shaped Gaussian filters, defined by the following equation:

$$f(x, y, \alpha) = he^{-\frac{\tilde{x}^2}{2\sigma_{\tilde{x}}^2} - \frac{\tilde{y}^2}{2\sigma_{\tilde{y}}^2}}, \quad (7)$$

wherein $\tilde{x} = x\cos(\alpha) - y\sin(\alpha),$ $\tilde{y} = x\sin(\alpha) + y\sin(\alpha),$ \quad (8)

and $\sigma_x$, $\sigma_y$ are the variances along the two dimensions, h is a normalization constant and $\alpha$ is the orientation angle of the filter, provided by the direction estimation block. The filters may be calculated each time or eventually stored in dedicated look-up tables.

In one embodiment, 5×5 directional filters have been taken into account. Since in the example embodiment the number of possible orientations is 8, only 8 Gaussian filters are needed for performing the directional filtering color interpolation, so they can be previously stored in a LUT (look up table). An alternative could be that of calculating the kernel filters each time they have to be applied, by means of equation (7). These filters are applied on the Bayer image for calculating the low pass filter (LPF) components of the three color planes (FIG. 4.r). The central pixel has information about its color channel, its LPF component is likewise computed in order to introduce the lost high frequencies in the other two color channels. More specifically, referring to equations (9) and (10), the difference between the original Bayer color value (G) and its directional LPF component ($G_{LPF\_DF}$) is added to the LPF component of the other color planes.

$$\Delta_{Peak} = G - G_{LPF\_DF} \tag{9}$$

$$R = R_{LPF\_DF} + \Delta_{Peak}$$

$$B = B_{LPF\_DF} + \Delta_{Peak} \tag{10}$$

With reference to FIG. 4, the high frequency content is added to the LPF component in the Peaking block (FIG. 4.t).

This step is justified by assuming that the red and blue channels, especially in the low frequencies, are correlated to the green channel within a small neighborhood of the considered pixel.

When the image to be processed is strongly corrupted by noise, the Peaking block may be disabled, because it may increase noise. Moreover, also the former sampled values in each pixel position can be conveniently substituted by the respective low-pass components, calculated through the color interpolation step through directional filtering. It has been observed that this helps in preventing noisy pixels from propagating also in the interpolated image.

Simple 3×3 Interpolation

The 5×5 directional filtering color interpolation may produce artifacts at borders, especially in textured images. This may be due because direction is wrongly estimated or because a too large window is used for interpolating a relatively small contoured region. These artifacts are not always removed by a successive antialiasing step, and they can be even enhanced by a subsequent sharpening step. To alleviate all this, a 3×3 interpolation may be performed in areas adjacent to a contour line.

In order to achieve good quality results near contours, it is possible to use an algorithm which analyzes the 5×5 neighborhood of the central pixel and eventually applies a 3×3 interpolation for avoiding any interpolation across contours.

Many 3×3 interpolation algorithms like the so-called bilinear interpolation, edge sensing and others have been proposed. A 3×3 interpolation algorithm that may be used is described in [8]. In one embodiment, a novel 3×3 interpolation algorithm based on comparing a threshold with a variable number of gradients is used for the method.

According to the color channel of the central pixel, four (G case) or eight (R or B case) gradients are computed in a 5×5 neighborhood. Each gradient is defined as the sum of absolute differences of pixels of the same color in this neighborhood. For each color channel to be interpolated, a proper subset of these gradients is selected to determine a threshold of acceptable gradients. Given a subset A of gradients, the threshold T is defined as:

$$T = (k_1 \text{Min}(A)) + [k_2(\text{Max}(A) - \text{Min}(A))] \tag{11}$$

wherein Max is the maximum gradient value in the set, and Min is the minimum gradient value. The first threshold component ($k_1$Min) accounts for the case in which the gradients are all almost alike such that all of them are included in setting a certain threshold. The second threshold component ($k_2$(Max−Min)) excludes the largest gradients, in case there is a significant difference between maximum and minimum values. As disclosed in [8], $k_1$=1.5 and $k_2$=0.5. Thanks to this threshold T, only a subset of neighboring pixels is selected for interpolating the central value. In particular, for all the gradients of the subset A lower than the threshold T, color components from the corresponding direction of the 3×3 neighborhood are used, averaging them to determine the missing color values.

Let us consider the 5×5 window shown in FIG. 13.a, wherein the central pixel is green. Four gradients are computed (north, south, west and east) through the equations (12):

$$\text{Ngrad} = |G_3 - G_{13}| + |H_8 - H_{18}|$$

$$\text{Sgrad} = |G_{23} - G_{13}| + |H_8 - H_{18}|$$

$$\text{Wgrad} = |G_{11} - G_{13}| + |J_{12} - J_{14}|$$

$$\text{Egrad} = |G_{15} - G_{13}| + |J_{12} - J_{14}| \tag{12}$$

wherein J is the red/blue channel and H is the blue/red channel, respectively.

For interpolating the missing H channel, the threshold $T_H$ is computed using the subset A={Ngrad, Sgrad}; for interpolating the J channel, the threshold $T_J$ is computed on the subset A={Wgrad, Egrad}.

The H channel is interpolated using either $H_8$ or $H_{18}$, or both of them, according to the values of the north and south gradients with respect to the $T_H$ value. In particular, if the north gradient (Ngrad) is smaller than the threshold $T_H$, then the value $H_8$ is used in the interpolation process; similarly, if the south gradient (Sgrad) is smaller than the threshold $T_H$, then the value $H_{18}$ is used for the interpolation. The H channel is interpolated by averaging only the H values, which are associated to gradients lower than the threshold $T_H$. The same method is used for interpolating the J channel; in this case $J_{12}$ is used in the average process only if the west gradient (Wgrad) is smaller than $T_J$, and $J_{14}$ is used only if the east gradient (Egrad) is smaller than $T_J$. Finally, the G channel is left unchanged if the image is substantially uncorrupted by noise, otherwise the channel G may be substituted by the corresponding values obtained by carrying out a 3×3 low-pass filtering.

If the central pixel does not belong to the green channel (FIG. 13.b), four other gradients are computed (northwest, northeast, southwest and southeast), according to the equations (13).

$$\text{NWgrad} = |J_1 - J_{13}| + |H_7 - H_{19}|$$

$$\text{NEgrad} = |J_5 - J_{13}| + |H_9 - H_{17}|$$

$$\text{SWgrad} = |J_{21} - J_{13}| + |H_{17} - H_9|$$

$$\text{SEgrad} = |J_{25} - J_{13}| + |H_{19} - H_7| \tag{13}$$

For interpolating the missing G channel, the related threshold $T_G$ is computed by using the subset A={Ngrad, Sgrad, Wgrad, Egrad}; for interpolating the H channel, the related threshold $T_H$ is computed on the subset A={NWgrad, NEgrad, SWgrad, SEgrad}. Even in this case, each missing color channel is interpolated by averaging the color values of the same channel in the 3×3 neighborhood, which are associated with gradients lower than the corresponding threshold.

In practice, the 3×3 interpolation technique of an embodiment differs from that disclosed in [8] above, because:
- only four gradients instead of eight are calculated for the central green pixel;
- the gradients are calculated using equations (12) and (13);
- the interpolation of the missing channels is carried out using pixels for which the gradient associated thereto is smaller than the variable threshold.

Omnidirectional Low-Pass Filter

This type of interpolation is performed on "plain" regions (e.g., areas of uniform tonality and color free of contour lines). A simple 5×5 omnidirectional low pass filter is applied for smoothing the image, removing residual noise from it.

Experiments

Numerous experiments have been carried out making a comparison between the previous Directional filtering color interpolation [9] above and the novel adaptive technique of one of the present embodiments.

Figure 14A:
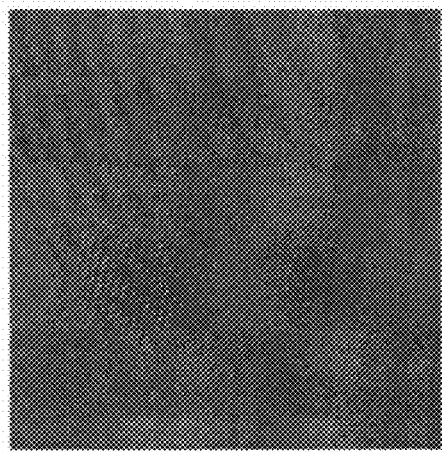
FIGS. 14a, 14b, 15a and 15b compare filtered pictures with a classic directional filtering color interpolation technique with the same pictures filtered with one embodiment of the method.
Figure 14B:
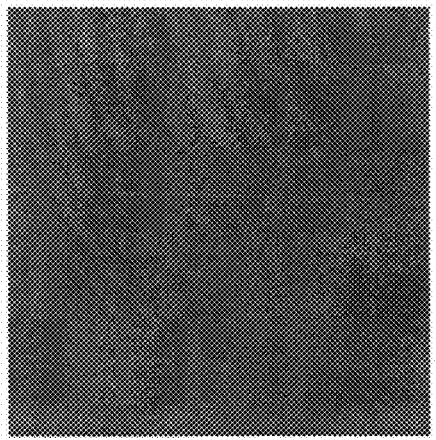

FIG. 14 shows a comparison between the two techniques. It is readily apparent that the adaptive technique (FIG. 14.b) outperforms the simple directional filtering color interpolation (FIG. 14.a), in a region difficult to be correctly interpolated, because of red/blue transitions with a green channel almost constant. The main advantage is determined by the modification of the gradient estimation process compared to the previous technique. In fact, FIG. 14.a shows a lot of artifacts generated by a wrong gradient estimation because of the above discussed weakness of Sobel operators on the Bayer pattern.

Figure 15A:
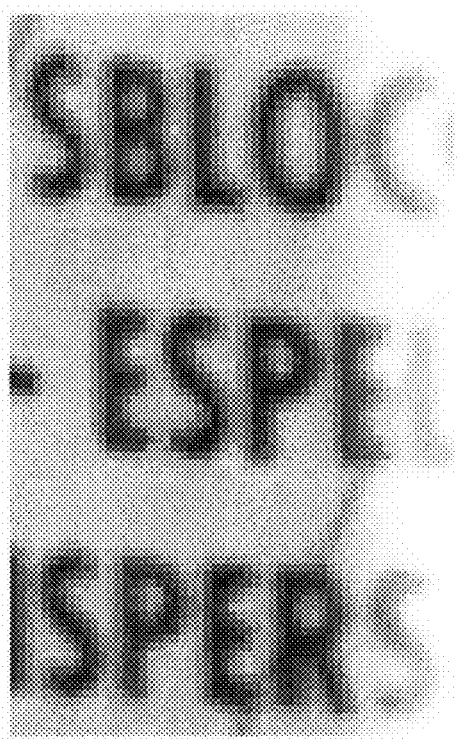
Figure 15B:
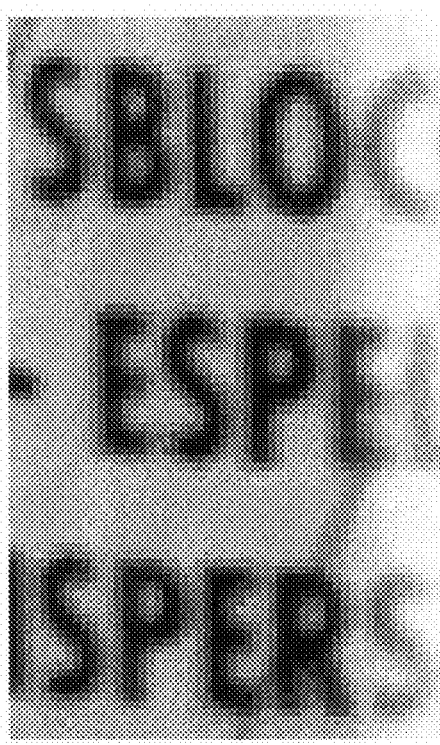

FIG. 15 shows another comparison between the two aforementioned techniques. It can be seen that the color interpolation (FIG. 15.b) of this embodiment, produces much less zipper noise compared to the previous technique (FIG. 15.a) in text images. This is mainly due to the use of a 3×3 interpolation algorithm in regions close to contour lines. Moreover, the adaptive demosaicing algorithm removes residual noise from the image, thanks to the application of a 5×5 low pass filter color interpolation in correspondence of plain regions. False colors in the interpolated image can be easily removed by an antialiasing step.

The results achieved by this adaptive demosaicing algorithm are comparable to Single Lens Reflex (SLR) camera performances.

Figure 16A:
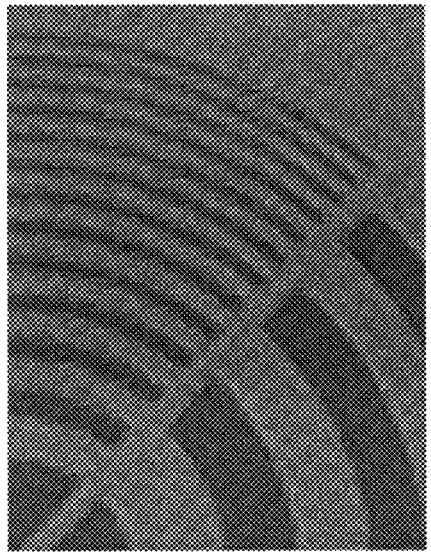
FIGS. 16a and 16b compare a picture filtered according to a SLR camera color interpolation technique and the same picture filtered according to one embodiment of the method.
Figure 16B:
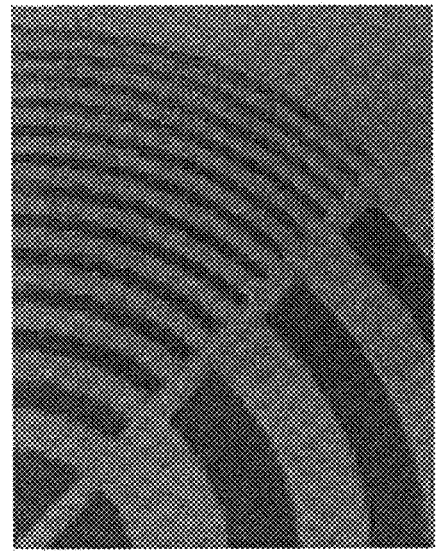

FIG. 16 shows a comparison between a Single Lens Reflex camera color interpolation algorithm and the adaptive demosaicing technique of this invention. The present embodiment outperforms the SLR camera algorithm in interpolating contours and red/blue transitions, reducing the introduction of zipper effects.

Deeper investigations showed that the above disclosed novel interpolation technique is based only upon spatial correlation among pixels included in the working window. Even if the results of novel algorithm of this invention are satisfactory, further improvement may be obtained by exploiting the fact that among neighboring pixels there is also a spectral correlation.

Figure 17:
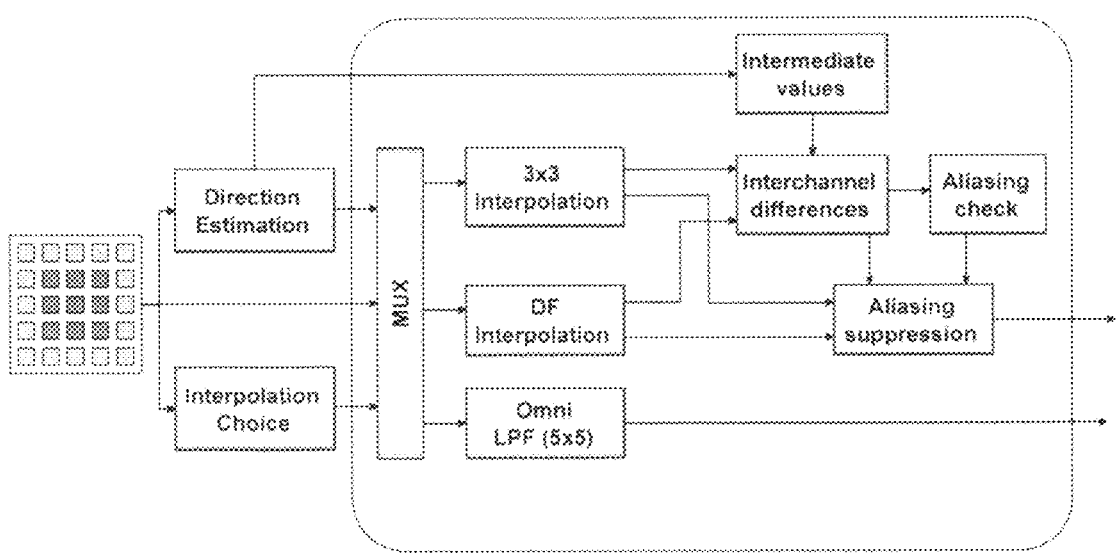
FIG. 17 depicts a basic block diagram of another embodiment of a device.

The block diagram of FIG. 3 may be modified as depicted in FIG. 17, such that interpolation steps are carried out considering also the spectral correlation among pixels belonging to a same working window.

In order to calculate differences among pixels of different channels in order to calculate their median value, intermediate values are calculated for the pixels of the considered working window. Moreover, in the diagram of FIG. 17 the block Aliasing Check decides whether it is necessary to suppress the aliasing on the interpolated pixels with a directional filtering or with a 3×3 interpolation.

The operations carried out by each block are illustrated in detail hereinbelow.

Directional Filtering and Antialiasing Integration

The directional filtering color interpolation technique, disclosed in [9] and [10] above, exploits spatial correlation. It allows to calculate the intensities of the pixels of the missing color components by finding the direction of the contour line and interpolating along it. Zipper effect does not arise but false colors are often generated, because spectral correlation is not exploited.

In order to apply a color difference constancy rule within a neighborhood, without increasing the window size, intermediate values are calculated.

For sake of example, two different cases will be analyzed:
1) red or blue central pixel;
2) green central pixel.

Figures 18, 19, 20:
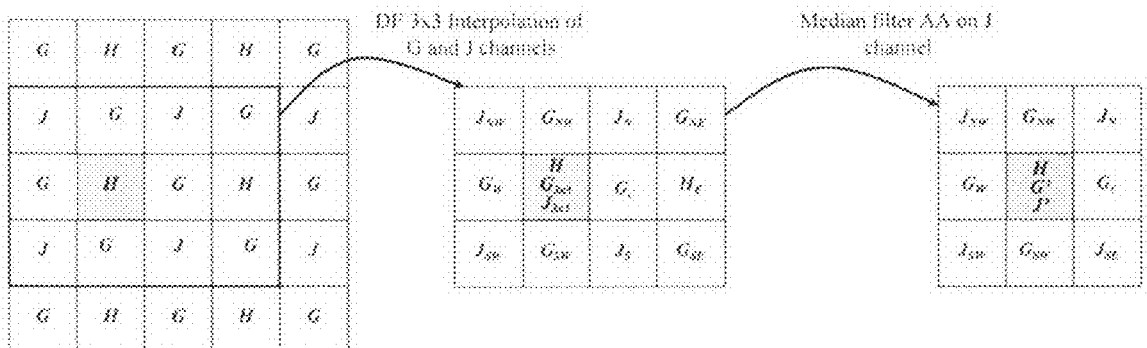
FIG. 18 depicts an example Bayer pattern wherein the central pixel of the working window is red or blue.
FIG. 19 depicts an example Bayer pattern wherein the central pixel of the working window is green.
FIG. 20 basically shows how to calculate the values G and J of a central pixel of a 3×3 working window for a horizontal interpolation direction, according to one embodiment.

Referring to FIG. 18, let us consider the case of a Red or Blue (H) central pixel.

The original sampled value (H) is left unchanged, thus it is not affected by aliasing. Moreover, because the green channel is sampled at a double rate compared to red and blue channels, aliasing is more likely to be present in the J channel, that represents blue or red pixels. While interpolating the central missing color values through the DF color interpolation ($G_{DF}$, $J_{DF}$) described in [9] above and previously illustrated, four intermediate G' values are interpolated at J locations. They could be calculated by applying a 3×3 directional interpolation, using the same direction of the central pixel.

Being I be the set of interchannel differences J-G, calculated at J and H locations within the 3×3 window (yellow pixels in FIG. 18), the value $J_{DF}$ is corrected by applying a median filter on the set I, according to the following equations (14).

$$J_C = \begin{cases} G_{DF} + \underset{I}{\mathrm{median}}\\ (J-G) \end{cases} \text{ if } \begin{pmatrix} (J_{DF} - G_{DF}) = \underset{I}{\min}(J-G) \\ \text{or} \\ (J_{DF} - G_{DF}) = \underset{I}{\max}(J-G) \end{pmatrix} \quad (14)$$
$$J_{DF} \quad \text{otherwise}$$

It should be noted that the color correction of the J channel is performed only if the J-G difference in correspondence to the central pixel ($J_{DF}$-$G_{DF}$) is the maximum or the minimum value within the set I. Otherwise, the value $J_{DF}$, that was generated by the 5×5 directional interpolation, is left unchanged. This is because a false color is related to a peak or a valley in the channel difference domain.

Let us consider the case of a green central pixel, as illustrated in FIG. 19.

In this case, aliasing could affect either H or J channels, or both of them. In particular, if the contour line direction is horizontal, false colors could be due to a wrong interpolation of the J channel. Vice versa, if the contour line direction is vertical, false colors could arise because of a bad interpolation of the H color channel. Finally, both H and J channels could be affected by aliasing in all other cases. This is the reason why three different cases for performing the most appropriate color correction have been considered.

In any case, the interpolation process begins with the 5×5 directional filtering interpolation of both H and J channels.

Then the intermediate values (G', H' and J') are calculated according to the interpolation direction.

Let us suppose to have a horizontal contour line. False colors, if present, are related to the J channel. In order to compute an intermediate J' value at H locations falling inside the 3×3 neighborhood of the central pixel, an algorithm, illustrated in FIG. 20, is executed. FIG. 20 shows the computation of G' and J' for the pixel at the left of the center.

First, a 3×3 directional interpolation is performed to compute both $G_{3\times3}$ and $J_{3\times3}$ values at H location. Then a set of interchannel differences is computed, taking into account that the interpolation direction is horizontal. This set is described by equations (15).

$$Diffs = \left\{ \begin{array}{c} J_{NW} - G_{NW}, J_N - (G_{NW} + G_{NE})/2, \\ J_{SW} - G_{SW}, J_S - (G_{SW} + G_{SE})/2, J_{3\times3} - G_{3\times3} \end{array} \right\} \quad (15)$$

The interchannel differences of the Diffs set are computed within the same 5×5 window used for the interpolation of the central pixel. Eventually, the corrected J' value is calculated according to equations (16).

$$G' = G_{3\times3} \quad (16)$$

$$J' = \begin{cases} G_{3\times3} + \underset{I}{\text{median}}(Diffs) & \text{if } \begin{pmatrix} (J_{3\times3} - G_{3\times3}) = \min(Diffs) \\ \text{or} \\ (J_{3\times3} - G_{3\times3}) = \max(Diffs) \end{pmatrix} \\ J_{3\times3} & \text{otherwise} \end{cases}$$

Once the same method is used for calculating G' and J' at the right side of the central pixel, the color correction formula of equations (17) is applied for outputting the missing color values at the central pixel location.

$$G_C = G \quad (17)$$

$$H_C = H_{DF}$$

$$J_C = \begin{cases} G_{DF} + \underset{I}{\text{median}}(J - G) & \text{if } \begin{pmatrix} (J_{DF} - G_{DF}) = \min_I(J - G) \\ \text{or} \\ (J_{DF} - G_{DF}) = \max_I(J - G) \end{pmatrix} \\ J_{DF} & \text{otherwise} \end{cases}$$

wherein I is the set of interchannel differences, calculated in correspondence of the yellow pixels in FIG. 19.

In case of vertical direction, the same algorithm is used to perform the color correction on the H channel (FIG. 21).

After the 3×3 directional interpolation of both $G_{3\times3}$ and $H_{3\times3}$ values at J location has been carried out, the set Diffs of vertical interchannel differences is computed according to equations (18).

$$Diffs = \left\{ \begin{array}{c} H_{NW} - G_{NW}, H_{NE} - G_{NE}, \\ H_{CW} - (G_{NW} + G_{SW})/2, \\ H_{CE} - (G_{NE} + G_{SE})/2, H_{3\times3} - G_{3\times3} \end{array} \right\} \quad (18)$$

Color correction of the H channel is performed according to equations (19).

$$G' = G_{3\times3} \quad (19)$$

$$H' = \begin{cases} G_{3\times3} + \text{median}(Diffs) & \text{if } \begin{pmatrix} (H_{3\times3} - G_{3\times3}) = \min(Diffs) \\ \text{or} \\ (H_{3\times3} - G_{3\times3}) = \max(Diffs) \end{pmatrix} \\ H_{3\times3} & \text{otherwise} \end{cases}$$

Lastly, the missing color values at the central pixel location are computed according to equations (20).

$$G_C = G \quad (20)$$

$$J_C = J_{DF}$$

$$H_C = \begin{cases} G_{DF} + \underset{I}{\text{median}}(H - G) & \text{if } \begin{pmatrix} (H_{DF} - G_{DF}) = \min_I(H - G) \\ \text{or} \\ (H_{DF} - G_{DF}) = \max_I(H - G) \end{pmatrix} \\ H_{DF} & \text{otherwise} \end{cases}$$

In the latter case (in which the interpolation direction is neither horizontal nor vertical) the intermediate values (J' and G' in the locations H; H' and G' in the locations J) are calculated with a 3×3 directional filtering.

They may be corrected by carrying out an antialiasing algorithm, as shown in FIG. 22.

Although the application of an antialiasing algorithm is not indispensable, it may significantly improve the quality of the final image. According to an embodiment of the present invention, the antialiasing algorithm described in [10] above is applied. According to the aforementioned patent and referring to FIG. 22, an antialiasing control signal A(j) is derived by a combination of an antialiasing control signal $A_h(j)$ derived by channel H and an antialiasing control signal $A_g(j)$ derived by channel G, as shown in equations (21):

$$A_h(j) = abs((H_{NW} + H_{SE}) - (H_{NE} + H_{SW}))$$

$$A_g(j) = abs((G_N + G_S) - (G_W + G_E))$$

$$A(j) = k_1 \cdot (\max(A_h(j), A_g(j))) \quad (21)$$

where $k_1$ is a constant, e.g., $k_1 = 0.5$.

Finally, the corrected intermediate color values are determined with equations (22):

$$G' = G_{3\times3} + A(j) \cdot (J - G_{3\times3})$$

$$H' = H_{3\times3} + A(j) \cdot (J - H_{3\times3}) \quad (22)$$

The missing color values in correspondence of the central pixel location are computed according to equations (23):

$$G_C = G \quad (23)$$

$$H_C = \begin{cases} G_{DF} + \underset{I}{\text{median}}(H - G) & \text{if } \begin{pmatrix} (H_{DF} - G_{DF}) = \min_I(H - G) \\ \text{or} \\ (H_{DF} - G_{DF}) = \max_I(H - G) \end{pmatrix} \\ H_{DF} & \text{otherwise} \end{cases}$$

-continued $$J_C = \begin{cases} G_{DF} + \underset{l}{\text{median}} & \text{if} \begin{pmatrix} (J_{DF} - G_{DF}) = \min_l(J - G) \\ \text{or} \\ (J_{DF} - G_{DF}) = \max_l(J - G) \end{pmatrix} \\ J_{DF} & \text{otherwise} \end{cases}$$

3×3 Interpolation and Antialiasing Integration

The previously described 3×3 interpolation algorithm may be modified in order to prevent or at least reduce the generation of false colors. Even in this case, the antialiasing integration requires the computation of intermediate values in order to perform a median filter color correction.

The 3×3 interpolation algorithm uses a threshold-based technique for processing a variable number of gradients.

Given a subset A of gradients, the threshold T is defined by equation (11). Using this threshold, only a subset of surrounding pixels of the central pixel of the working window is selected for interpolating the central value.

Four gradients are computed, as illustrated in equations (12), and the thresholds $T_H$ and $T_J$ are calculated as described above.

The antialiasing integration requires calculation of the median value of interchannel differences. As in FIG. 19, also in this case it is necessary to calculate G', H' and J' values at yellow locations.

In this case the central missing color values are interpolated with the aforementioned technique. The intermediate values at the north-south-west and east locations are simply interpolated by averaging the four adjacent pixels belonging to the same color channel and then applying the antialiasing formulas of (21) and (22). Referring to FIG. 23A, H'$_8$ and G'$_8$ for example are interpolated as follows:

$$H_8=(H_2+H_4+H_{12}+H_{14})/4$$

$$G_8=(G_3+G_7+G_9+G_{13})/4$$

$$H'_8=H_8+A(j)\cdot(J_8-H_8)$$

$$G'_8=G_8+A(j)\cdot(J_8-G_8) \quad (24)$$

where A(j) is determined through equation (21).

Two sets of interchannel differences are used for performing the color correction step (25):

$$Diffs_J = \{J_8 - G_8, J_{12} - G_{12}, J_{13} - G_{13}, J_{14} - G_{14}, J_{18} - G_{18}\} \quad (25)$$

$$Diffs_H = \{H_8 - G_8, H_{12}, H_{13} - G_{13}, H_{14} - G_{14}, H_{18} - G_{18}\}$$

$$G_C = G_{13}$$

$$H_C = \begin{cases} G_C + \text{median} \\ (Diffs_H) & \text{if} \begin{pmatrix} (H_{13} - G_{13}) = \min(Diffs_H) \\ \text{or} \\ (H_{13} - G_{13}) = \max(Diffs_H) \end{pmatrix} \\ H_{13} & \text{otherwise} \end{cases}$$

$$J_C = \begin{cases} G_C + \text{median} \\ (Diffs_J) & \text{if} \begin{pmatrix} (J_{13} - G_{13}) = \min(Diffs_J) \\ \text{or} \\ (J_{13} - G_{13}) = \max(Diffs_J) \end{pmatrix} \\ J_{DF} & \text{otherwise} \end{cases}$$

If the direction of the central pixel is horizontal, only the J channel should be corrected:

$$J_{13} = (J_8 + J_{18})/2 \quad (26)$$

$$Diffs_J = \{J_8 - (G_7 + G_9)/2, J_{13} - G_{13}, J_{18} - (G_{17} + G_{19})/2\}$$

$$J_C = \begin{cases} G_{13} + \text{median} \\ (Diffs_J) & \text{if} \begin{pmatrix} (J_{13} - G_{13}) = \min(Diffs_J) \\ \text{or} \\ (J_{13} - G_{13}) = \max(Diffs_J) \end{pmatrix} \\ J_{13} & \text{otherwise} \end{cases}$$

Vice versa, if the direction of the central pixel is vertical, only the H channel should be corrected:

$$H_{13} = (H_{12} + H_{14})/2 \quad (27)$$

$$Diffs_H = \{H_{12} - (G_7 + G_{17})/2, H_{13} - G_{13}, H_{14} - (G_9 + G_{19})/2\}$$

$$H_C = \begin{cases} G_{13} + \text{median} \\ (Diffs_H) & \text{if} \begin{pmatrix} (H_{13} - G_{13}) = \min(Diffs_H) \\ \text{or} \\ (H_{13} - G_{13}) = \max(Diffs_H) \end{pmatrix} \\ H_{13} & \text{otherwise} \end{cases}$$

If the central pixel does not belong to the green channel, as in FIG. 23B, four more gradients are computed as previously described, using equations (13).

The interpolated value $J_{13}$ is then adjusted using a median filter antialiasing algorithm. More specifically, if the direction of the central pixel is supposed to be horizontal, the following differences are computed.

$$Diffs_J = \begin{Bmatrix} J_7 - (G_6 + G_8)/2, J_9 - (G_8 + G_{10})/2, J_{13} - G_{13}, \\ J_{17} - (G_{16} + G_{18})/2, J_{19} - (G_{18} + G_{20})/2 \end{Bmatrix} \quad (28)$$

Otherwise, if the direction of the central pixel is vertical, the following values Diffs$_J$ are computed.

$$Diffs_J = \begin{Bmatrix} J_7 - (G_6 + G_8)/2, J_9 - (G_8 + G_{10})/2, J_{13} - G_{13}, \\ J_{17} - (G_{12} + G_{221})/2, J_{19} - (G_{14} + G_{24})/2 \end{Bmatrix} \quad (29)$$

If the direction of the central pixel is neither horizontal nor vertical, four intermediate G' values are computed at J locations. For example, G'$_7$ is interpolated as follows:

$$G_7=(G_2+G_6+G_8+G_{12})/4$$

$$G'_7=G_7+A(j)\cdot(J_7-G_7) \quad (30)$$

wherein A(j) is determined through the (21).

In this case the values Diffs$_J$ are:

$$Diffs_J=\{J_7-G'_7, J_9-G'_9, J_{13}-G_{13}, J_{17}-G'_{17}, J_{19}-G'_{19}\} \quad (31)$$

The color correction of the J channel is finally achieved with the following well known expressions (32):

$$J_C = \begin{cases} G_{13} + \text{median} \\ (Diffs_J) & \text{if} \begin{pmatrix} (J_{13} - G_{13}) = \min(Diffs_J) \\ \text{or} \\ (J_{13} - G_{13}) = \max(Diffs_J) \end{pmatrix} \\ J_{13} & \text{otherwise} \end{cases} \quad (32)$$

This further improvement may be implemented in three different ways. The intermediate values may be computed (FIG. 24) in real time while interpolating the central pixel by means of the technique disclosed in the preceding paragraphs.

Figure 24A:
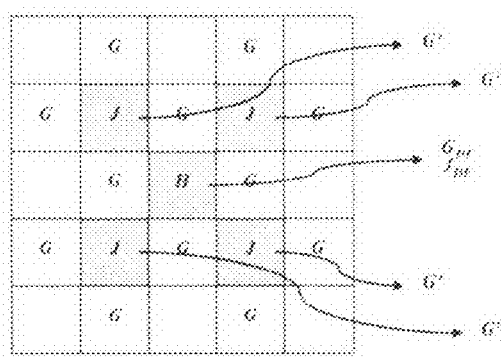
FIGS. 24a and 24b basically show another embodiment of the method for calculating intermediate values of the central pixel of a working window.
Figure 24B:
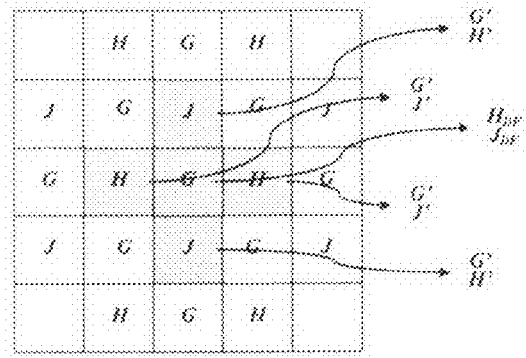

Even if FIG. 24 refers to the case in which the central pixel is interpolated by directional filtering color interpolation, it could even be alternatively interpolated by the 3×3 simple interpolation technique.

As an alternative, it is possible to use a dedicated memory to avoid estimation of the already interpolated values. With this expedient, more accurate results are achieved at the cost of an increase of memory requirement.

Figure 25A:
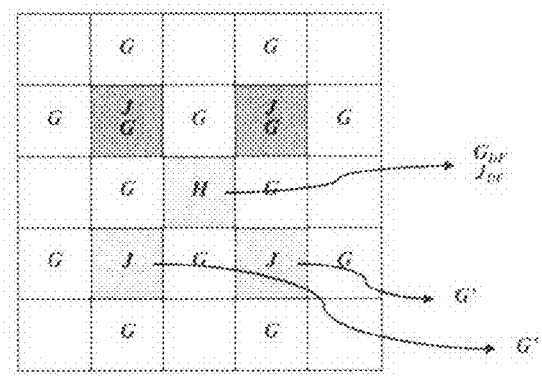
FIGS. 25a and 25b basically show another embodiment of the method for calculating intermediate values of the central pixel of a working window using a line memory.
Figure 25B:
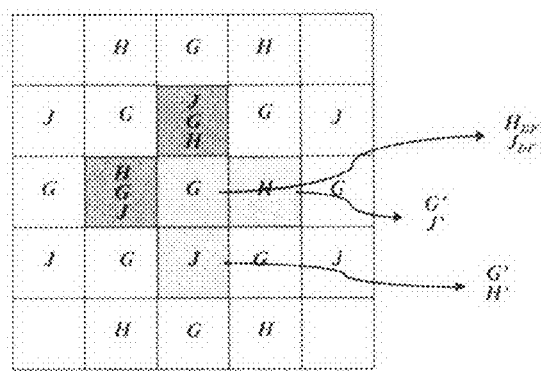

In FIG. 25, the pixels highlighted with a green background represent the already computed values, whereas the pixels highlighted with a yellow background are calculated while interpolating the central pixel. As an alternative, before interpolating a G pixel, its successive H pixel is interpolated in order to reduce the number of operations (less intermediate values are calculated) and to have an enhanced aliasing suppression. The interpolated values at H location can be stored in a register.

Figure 26:
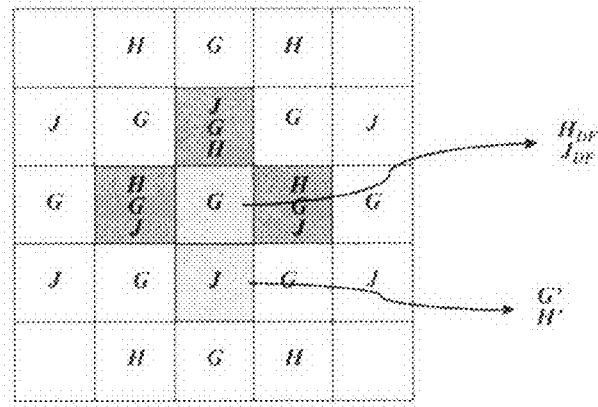
FIG. 26 basically shows another embodiment of the method for calculating intermediate values of the central pixel of a working window by reducing the number of intermediate values to be calculated.

In FIG. 26, the pixels highlighted with a green background represent the values which have been already interpolated before interpolating the central pixel. It should be noticed that the interpolation of the H pixel at right avoids the estimation of intermediate values, without any extra computation compared with the preceding forms of implementations.

Tests

The technique illustrated in FIG. 17 has been tested and the results obtained have been compared with those obtained using the technique illustrated in FIG. 3.

Figures 27A, 27B:
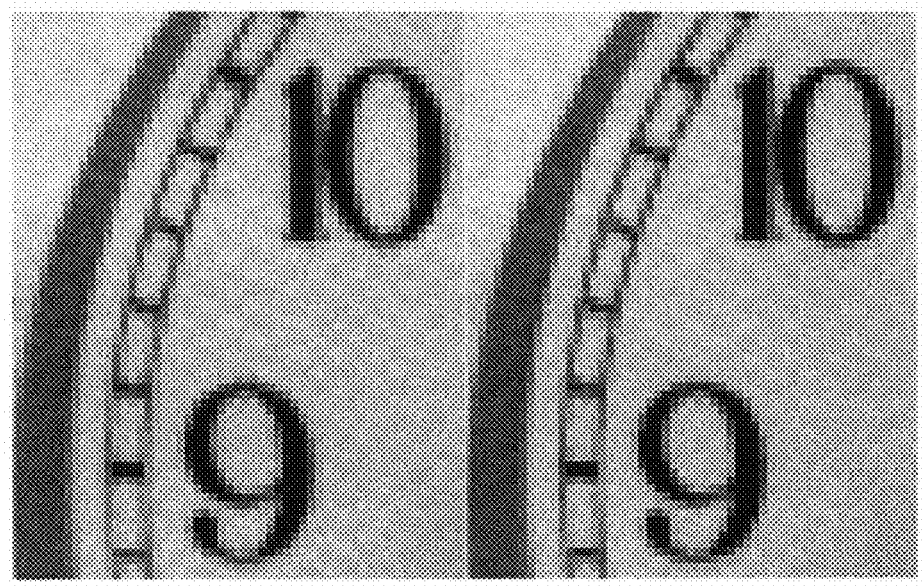
Figures 28A, 28B:
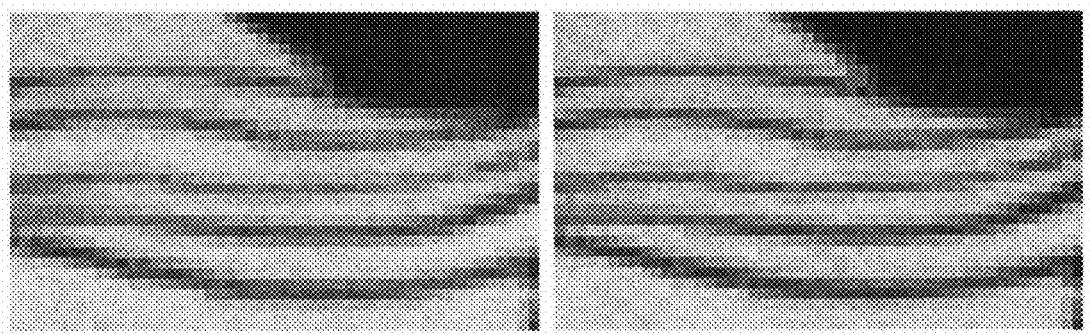
Figure 29A:
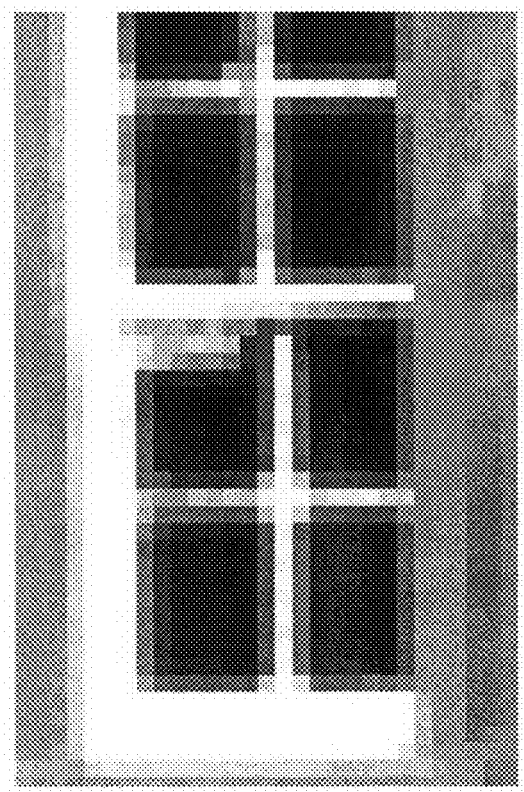
Figure 29B:
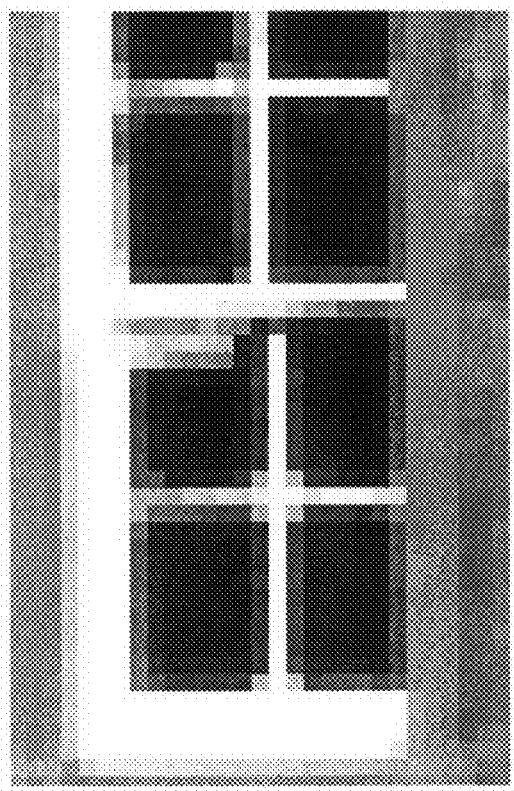

FIGS. 27a, 28a and 29a are images interpolated using the technique of FIG. 3, while the images in FIGS. 27b, 28b and 29b were obtained using the technique of FIG. 17. By comparison, it is evident that the enhanced technique of FIG. 17 outperforms the adaptive directional filtering color interpolation in removing false colors.

An embodiment can be provided in which computer-readable instructions, such as computer program, are loadable into computer-readable storage medium (such as an internal memory of a computer) and include software code for executing the method(s) described above, when the code is executed by the computer.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A method of color interpolation of an image acquired by a digital color sensor generating values of grey levels for each image pixel as a function of a filter applied to the sensor, interpolating values of missing colors of each image pixel for generating distinct values of primary colors or complementary hues for each image pixel, the method comprising:

a) selecting a (2k+1)×(2k+1) working window of said image centered around a pixel to be filtered, k being an integer number;

b) determining a direction of interpolation of the central pixel of said working window;

c) calculating statistical parameters defined as a function of moments of an intensity of pixels of a same primary color or complementary hue of said (2k+1)×(2k+1) window and of at least another working window of smaller size centered around the pixel to be filtered; and d) as a function of values of said statistical parameters of the (2k+1)×(2k+1) working window and of said at least one working window of smaller size, deciding of filtering said central pixel according to an interpolation chosen in a group that includes a homogeneous low-pass interpolation carried out on pixels of the (2k+1)×(2k+1) working window, an interpolation carried out on pixels of the working window of smaller size, a directional filtering interpolation carried out on pixels of the working window of smaller size, and adaptive interpolations determined by said calculated statistical moments.

2. The method of claim 1 wherein:

said a) includes selecting a 5×5 working window of said image centered around said pixel to be filtered;

said b) includes determining said direction of interpolation of the central pixel of said 5×5 working window;

said c) includes calculating averages and standard deviations of the intensity of the pixels of said same primary color or complementary hue of said 5×5 working window and of a 3×3 working window centered around the pixel to be filtered; and said d) includes as functions of the values of said averages and standard deviations of the 5×5 and 3×3 working windows, deciding to filter said central pixel with said interpolation chosen in a set that includes a homogeneous low-pass interpolation carried out on the pixels of the 5×5 working window, an interpolation algorithm carried out on the pixels of the 3×3 working window, a directional filtering interpolation carried out on the pixels of the 3×3 working window, and adaptive interpolations determined by said calculated statistical moments.

3. The method of claim 2 wherein said central pixel is filtered through:

d1) comparing variances of the 5×5 and 3×3 working windows with a lower threshold and an upper threshold;

d2) as a function of results of the comparison at d1), deciding to filter said central pixel with said homogeneous low-pass interpolation carried out on the pixels of the 5×5 working window or with said interpolation algorithm carried out on the pixels of the 3×3 working window or with said directional filtering interpolation carried out on the pixels of the 3×3 working window.

4. The method of claim 3, further comprising executing said low-pass interpolation on the pixels of the same primary color or complementary hue of the 5×5 working window if both respective variances of said 5×5 working window and of said 3×3 working window are smaller than the lower threshold, or executing said directional filtering interpolation if both respective variances of said 5×5 working window and of said 3×3 working window are larger than the upper threshold, or in other cases deciding whether to carry out said interpolation algorithm on the pixels of the 3×3 working window or said directional filtering interpolation depending on values of first and second auxiliary parameters calculated as a function of an absolute value of differences of intensity of pixels of said 5×5 working window.

5. The method of claim 4 wherein said auxiliary parameters are determined through:
for each primary color or complementary hue, determining a mean intensity and variance of corresponding pixels of said 5×5 working window; and
subdividing the pixels of said 5×5 working window into:
a group of pixels of a first level of intensity containing pixels with intensity smaller than a difference between a respective mean intensity and a square root of a respective variance,
a group of pixels of a second level of intensity containing pixels with intensity between the difference between the respective mean intensity and the square root of the respective variance and a sum between the respective mean intensity and the square root of the respective variance,
a group of pixels of a third level of intensity containing pixels with intensity larger than the sum between the respective mean intensity and the square root of the respective variance;
said first auxiliary parameter is a sum of absolute values of differences between a level of the central pixel and a level of each pixel adjacent thereto; and
said second auxiliary parameter is obtained by determining a direction of interpolation over said 5×5 working window and calculating a sum of absolute values of differences between levels of the pixels of the 5×5 working window laying along a direction of interpolation and levels of pixels adjacent thereto.

6. The method of claim 5 wherein said interpolation algorithm on the pixels of the 3×3 working window is executed when said first auxiliary parameter is smaller than the second auxiliary parameter, and said directional filtering interpolation is executed when said second auxiliary parameter is smaller than the first auxiliary parameter.

7. The method of claim 6, further comprising executing a peaking operation to introduce in the image high frequency components that were lost during filtering of said image only if said interpolation algorithm on the pixels of the 3×3 working window is not to be carried out.

8. The method of claim 3 wherein said direction of interpolation is determined by calculating spatial variation gradients of primary colors or complementary base hues for each image pixel and storing information of directional variations of a primary color or complementary hue in a temporary memory pertaining to each pixel.

9. The method of claim 8 wherein said image is a Bayer pattern image and components along two coordinate directions of said spatial variation gradients and said directional variations are calculated over values of pixels contained in a window centered on a selected image pixel by carrying out:
if the central pixel of said window is green, calculating direction and amplitude of gradients of each primary color as a function of values of pixels contained in said window;
if said amplitudes of gradients of red and blue pixels of said window are both larger by at least a pre-established factor than an amplitude of a gradient referred of green pixels of said window, establishing that a gradient direction associated to the central pixel of the window is a direction of the gradient of the red or the blue pixels that has maximum amplitude; and
if said amplitudes of gradients of the red and the blue pixels of said window are not both larger by at least said pre-established factor than the amplitude of the gradient of the green pixels of said window, calculating components along two coordinate directions of said spatial variation gradients using Sobel operators on sensed values of said image pixels.

10. The method of claim 9 wherein the components along two coordinate directions of said spatial variation gradients are calculated using Sobel operators on the sensed values of said image pixels, and said directional variations are generated using for each image pixel a "weighted-moda" operator over a window centered on the selected image pixel, comprising:
storing amplitude values and quantized direction values of the spatial variation gradients for each pixel around a central pixel as a function of said calculated components;
for each quantized orientation, calculating a sum of amplitudes of gradients oriented in said direction for each of the pixels contained in said window;
establishing which of said sums is largest; and
establishing a direction of a gradient associated to said central pixel as a function of the largest sum.

11. The method of claim 9 wherein said factor is four.

12. The method of claim 10, further comprising:
for each image pixel, storing in said temporary memory said directional variations generated using said "weighted-moda" operator; and
estimating directional variations associated to a current central pixel by using already calculated and stored directional variations associated to pixels adjacent to the central pixel.

13. The method of claim 3 wherein said interpolation algorithm on the pixels of the 3×3 working window is carried out through a threshold-based variable number of gradients technique.

14. The method of claim 3, further comprising compensating eventual aliasing corrupting interpolated red or blue pixels through said interpolation carried out at d2) through, for each working window:
if the central sampled pixel is blue or red,
estimating through interpolation intensities of green and red or blue pixels within a 3×3 auxiliary window concentric with said working window,
calculating in said auxiliary 3×3 window a maximum value, a minimum value and a median value of differences between red or blue pixels and corresponding green pixels, and
if in correspondence of the central pixel of said working window is associated the maximum or the minimum of said differences, correcting both the intensity of a red or blue central pixel by imposing that it is equal to the intensity of a central green pixel increased of said median difference, otherwise leaving unchanged the intensity value obtained through said interpolation; and
if the central sampled pixel is green, estimating through said interpolation the intensity of the green, red and blue pixels within an auxiliary 3×3 window concentric with said working window, then correcting the intensity value of a central red or blue pixel through:
calculating in said auxiliary 3×3 window the maximum value, the minimum value and the median value of the differences between red or blue pixels and corresponding green pixels, and
if the maximum or the minimum of said differences is associated to the central red or blue pixel of said working window, correcting the intensity of the central red or blue pixel by imposing that it is equal to the intensity of the central green pixel increased by said median difference, otherwise leaving unchanged the intensity value thereof obtained through interpolation.

15. An article of manufacture, comprising:
a computer-readable medium having stored thereon a computer program that includes software code executable by a computer to interpolate color of an image having pixels, by:
   a) selecting a (2k+1)×(2k+1) working window of said image centered around a pixel to be filtered, k being an integer number;
   b) determining a direction of interpolation of the central pixel of said working window;
   c) calculating statistical parameters defined as a function of moments of an intensity of pixels of a same primary color or complementary hue of said (2k+1)×(2k+1) window and of at least another working window of smaller size centered around the pixel to be filtered; and
   d) as a function of values of said statistical parameters of the (2k+1)×(2k+1) working window and of said at least one working window of smaller size, selecting a filtering algorithm for said central pixel according to a particular interpolation technique that enhances contour sharpness and reduces noise and artifacts.

16. The article of manufacture of claim 15 wherein said particular interpolation technique includes a homogeneous low-pass interpolation carried out on pixels of the (2k+1)×(2k+1) working window.

17. The article of manufacture of claim 15 wherein said particular interpolation technique includes an interpolation carried out on pixels of the working window of smaller size.

18. The article of manufacture of claim 15 wherein said particular interpolation technique includes a directional filtering interpolation carried out on pixels of the working window of smaller size.

19. The article of manufacture of claim 15 wherein said particular interpolation technique includes adaptive interpolations determined by said calculated statistical moments.

20. A device adapted interpolate color of an image having pixels, the device comprising:
   a selection block to select a first working window of said image centered around a pixel to be filtered;
   a variance analysis block to calculate variances of intensity of the pixels of a same primary color or complementary hue of said first working window and of a second working window centered around the pixel to be filtered and smaller than said first working window, and to compare said variances of the first and second working windows with a low threshold and a high threshold;
   a direction estimation block to determine a direction of interpolation of the central pixel of said working window; and
   an interpolation block coupled with said direction estimation block, said variance analysis block, and selection block, said interpolation block being adapted to filter said central pixel, as a function of results of comparison carried out by said variance analysis block, with a homogeneous low-pass interpolation carried out on the pixels of the first working window, or with an interpolation algorithm carried out on the pixels of the second working window, or with a directional filtering interpolation carried out on the pixels of the second working window.

21. The device of claim 20 wherein said image is a Bayer pattern image.

22. The device of claim 20 wherein said first working window is of size 5×5, and wherein said second working window is of size 3×3.

23. A system adapted interpolate color of an image having pixels, the device comprising:
   means for selecting a (2k+1)×(2k+1) working window of said image centered around a pixel to be filtered, k being an integer number;
   means for determining a direction of interpolation of the central pixel of said working window;
   means for calculating statistical parameters defined as a function of moments of an intensity of pixels of a same primary color or complementary hue of said (2k+1)×(2k+1) window and of at least another working window of smaller size centered around the pixel to be filtered; and
   means for, as a function of values of said statistical parameters of the (2k+1)×(2k+1) working window and of said at least one working window of smaller size, selecting a filtering algorithm for said central pixel according to a particular interpolation technique that enhances contour sharpness and reduces noise and artifacts.

24. The system of claim 23, further comprising image sensor means for acquiring said image having pixels.

25. The system of claim 23 wherein said particular interpolation technique includes a homogeneous low-pass interpolation carried out on pixels of the (2k+1)×(2k+1) working window.

26. The system of claim 23 wherein said particular interpolation technique includes an interpolation carried out on pixels of the working window of smaller size.

27. The system of claim 23 wherein said particular interpolation technique includes a directional filtering interpolation carried out on pixels of the working window of smaller size.

28. The system of claim 23 wherein said particular interpolation technique includes adaptive interpolations determined by said calculated statistical moments.

* * * * *